(12) United States Patent
Fukui

(10) Patent No.: US 10,781,547 B2
(45) Date of Patent: Sep. 22, 2020

(54) WASHING MACHINE

(71) Applicant: LG ELECTRONICS INC., Seoul (KR)

(72) Inventor: Ikuma Fukui, Seoul (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 15/502,604

(22) PCT Filed: Aug. 10, 2015

(86) PCT No.: PCT/KR2015/008358
§ 371 (c)(1),
(2) Date: Feb. 8, 2017

(87) PCT Pub. No.: WO2016/024777
PCT Pub. Date: Feb. 18, 2016

(65) Prior Publication Data
US 2017/0233925 A1 Aug. 17, 2017

(30) Foreign Application Priority Data
Aug. 11, 2014 (KR) .................. 10-2014-0103376

(51) Int. Cl.
*D06F 37/30* (2020.01)
*H02K 21/22* (2006.01)
(Continued)

(52) U.S. Cl.
CPC .......... *D06F 37/304* (2013.01); *H02K 1/146* (2013.01); *H02K 1/2786* (2013.01); *H02K 21/22* (2013.01);
(Continued)

(58) Field of Classification Search
CPC .... D06F 37/304; H02K 1/146; H02K 1/2786; H02K 21/22; H02K 21/42; H02K 51/00; H02K 49/10
(Continued)

(56) References Cited

U.S. PATENT DOCUMENTS

2007/0186692 A1   8/2007  Waszak
2010/0307201 A1  12/2010  Shiga et al.
2011/0215668 A1   9/2011  Peng et al.

FOREIGN PATENT DOCUMENTS

CN    1691469    11/2005
CN    1929267     3/2007
(Continued)

OTHER PUBLICATIONS

CN1929267A—machine translation (Year: 2007).*
(Continued)

*Primary Examiner* — Tinsae B Ayalew
(74) *Attorney, Agent, or Firm* — Fish & Richardson P.C.

(57) ABSTRACT

Disclosed is a magnetic gear apparatus including a rotational magnetic force generator configured to generate rotational magnetic force, a magnetic path creator having a hollow shape so as to be provided at an outer circumferential surface of the rotational magnetic force generator, the magnetic path creator being configured to create a magnetic path of the rotational magnetic force generated from the rotational magnetic force generator, and a rotor provided at an outer circumferential surface of the magnetic path creator, the rotor including permanent magnets provided at an inner circumferential surface thereof and being rotatable by the rotational magnetic force. The rotational magnetic force generator includes one or more pairs of alternately arranged
(Continued)

N-pole units and S-pole units. A torque of the rotor may vary as the number of the N-pole units and the S-pole units is adjusted.

9 Claims, 6 Drawing Sheets

(51) Int. Cl.
    *H02K 51/00*     (2006.01)
    *H02K 1/14*     (2006.01)
    *H02K 1/27*     (2006.01)
    *H02K 49/10*     (2006.01)
    *H02K 21/42*     (2006.01)

(52) U.S. Cl.
    CPC ............. *H02K 51/00* (2013.01); *H02K 21/42* (2013.01); *H02K 49/10* (2013.01)

(58) Field of Classification Search
    USPC .......................................................... 68/140
    See application file for complete search history.

(56) References Cited

FOREIGN PATENT DOCUMENTS

| | | |
|---|---|---|
| CN | 101404435 | 4/2009 |
| CN | 101789667 | 7/2010 |
| CN | 101849058 | 9/2010 |
| CN | 201904666 | 7/2011 |
| CN | 102899847 | 1/2013 |
| CN | 103727202 | 4/2014 |
| CN | 202203361 | 4/2014 |
| EP | 2237390 A2 | 10/2010 |
| EP | 2264860 | 12/2010 |
| JP | H01198264 | 8/1989 |
| JP | 11069677 | 3/1999 |
| JP | 2001251822 | 9/2001 |
| JP | 2011182638 | 9/2011 |
| JP | 2013034317 A2 | 2/2013 |
| JP | 2014039446 A2 | 2/2014 |
| JP | 2014039448 | 2/2014 |

OTHER PUBLICATIONS

International Search Report and Written Opinion in International Application No. PCT/KR2015/008358, dated Oct. 28, 2016, 10 pages (with English translation).
Extended European Search Report in European Application No. 15832621.5, dated Feb. 20, 2018, 11 pages.
Sakai et al., "Permanent Magnet Motor Capable of Pole Changing for High Efficiency," In Energy Conversion Congress and Exposition (ECCE), 2013 IEEE, Sep. 2013, pp. 5064-5071.
Ostovic, "Pole-changing permanent-magnet machines," IEE Transactions on Industry Applications 38, No. 6, Nov. 2002, pp. 1493-1499.
Sano, "Pole-changing of salient-pole synchronous machines," Transactions of the American Institute of Electrical Engineers, Part III: Power Apparatus and Systems 79, No. 3, Dec. 1960, pp. 948-954.
Chinese Office Action in Chinese Application No. 201580035405.1, dated Jun. 27, 2018, 17 pages.
Wang et al., "Development of a Magnetic-Geared Permanent-Magnet Brushless Motor," IEEE Transactions on Magnetics, vol. 45, No. 10, dated Oct. 2009, 4 pages, XP011276984.
European Office Action in European Application No. 15832621.5, dated Nov. 13, 2019, 8 pages.
European Office Action in European Application No. 15832621.5, dated Jul. 22, 2020, 6 pages.
Korean Office Action in Korean Application No. 10-2014-0103376, dated Jul. 29, 2020, 15 pages. (with English translation).

\* cited by examiner

[Fig. 1]
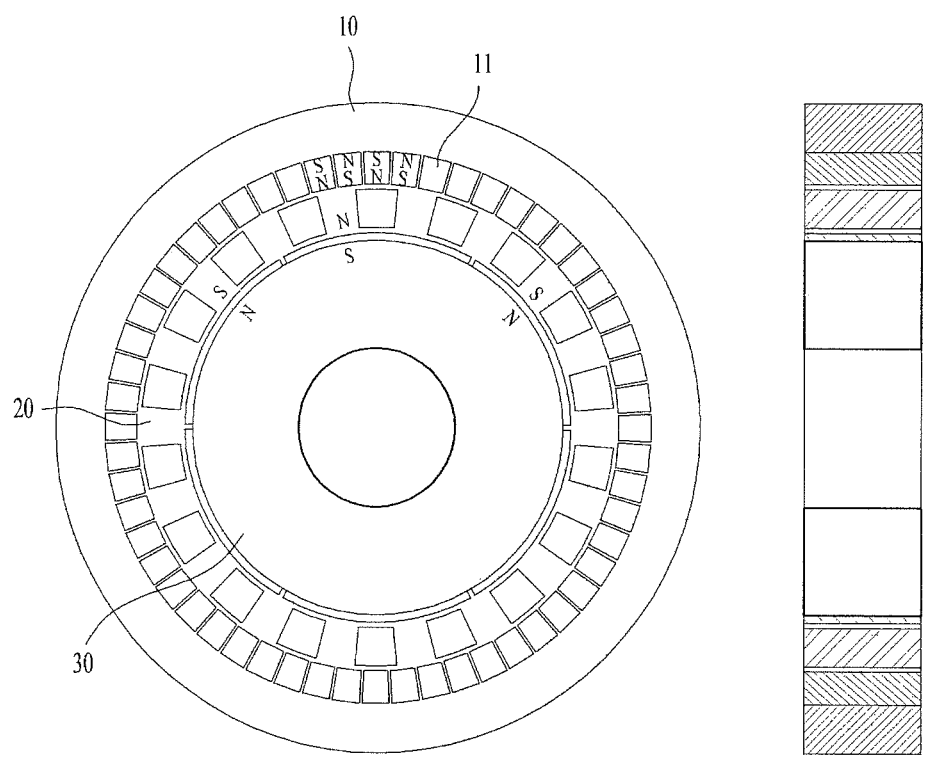

[FIG. 2]
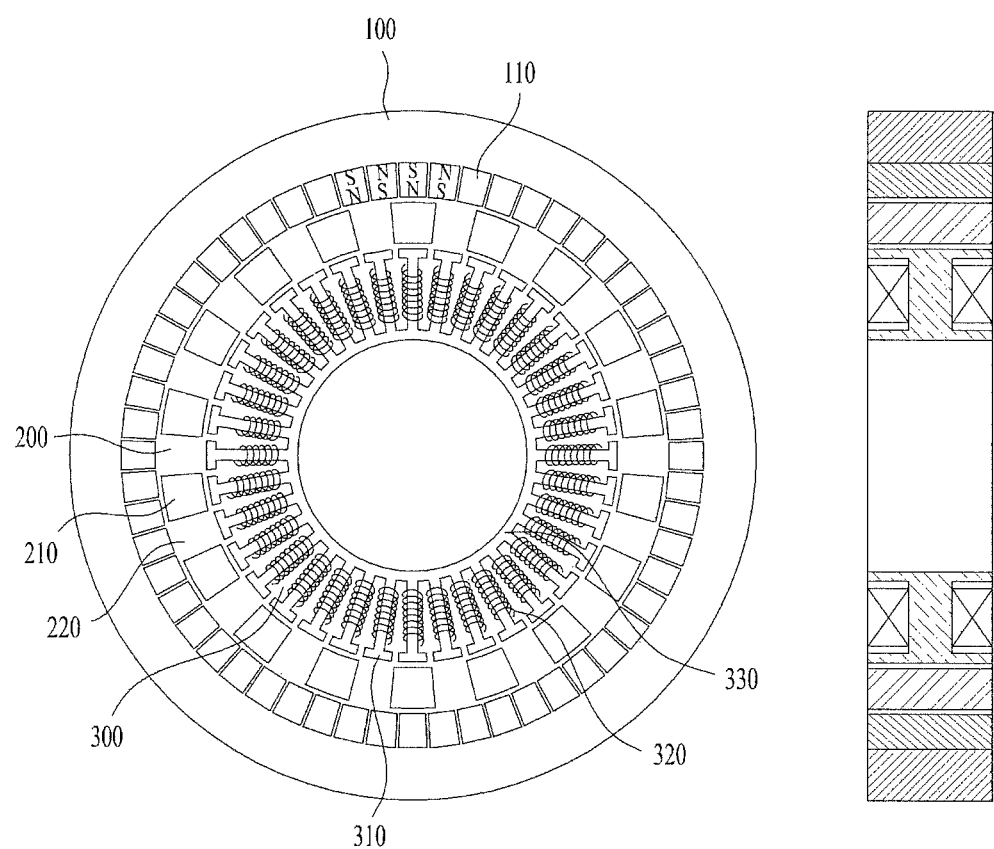

[Fig. 3]
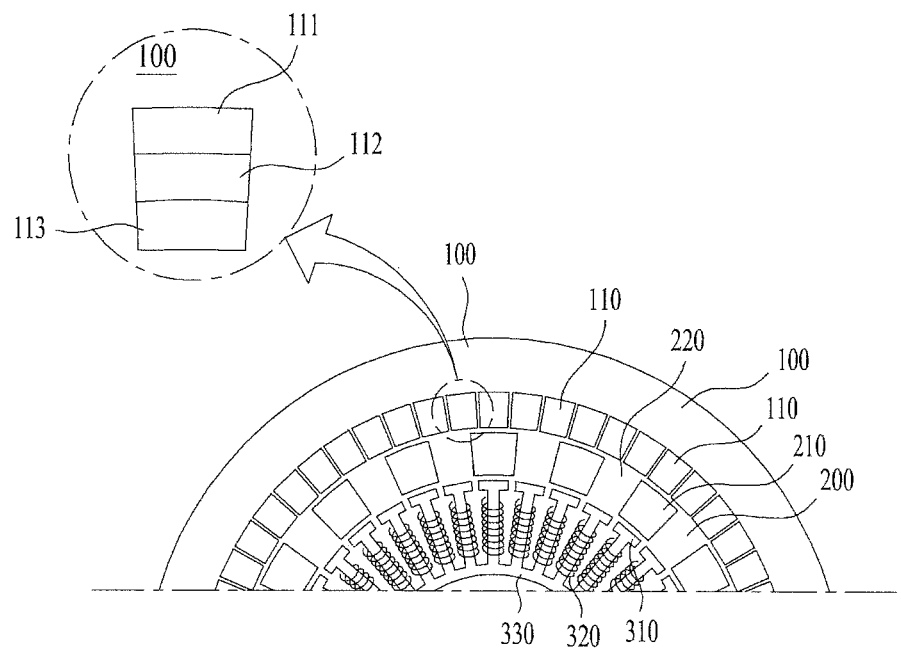
[Fig. 4]
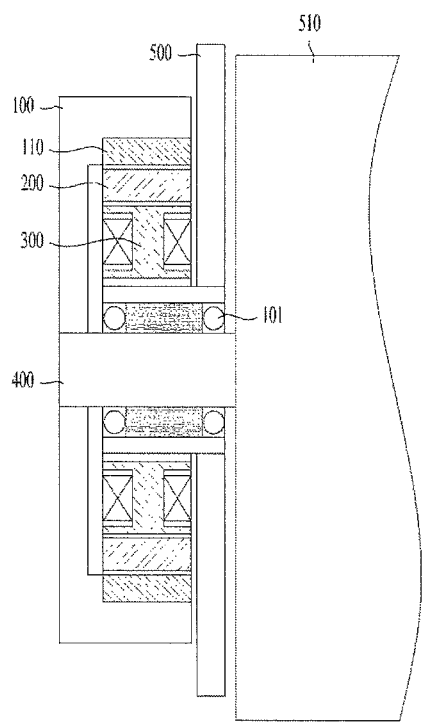

[Fig. 5]
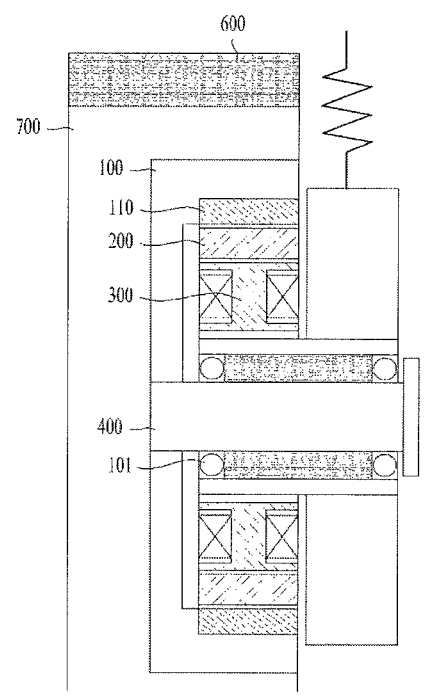

【Fig. 6】
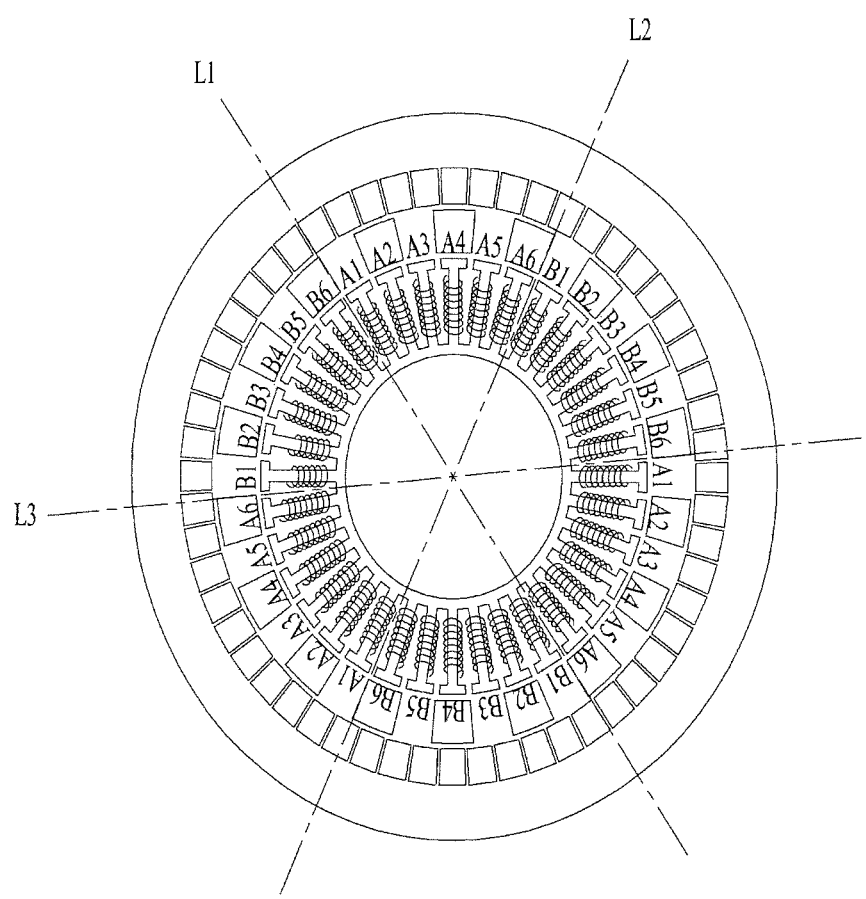

[Fig. 7]
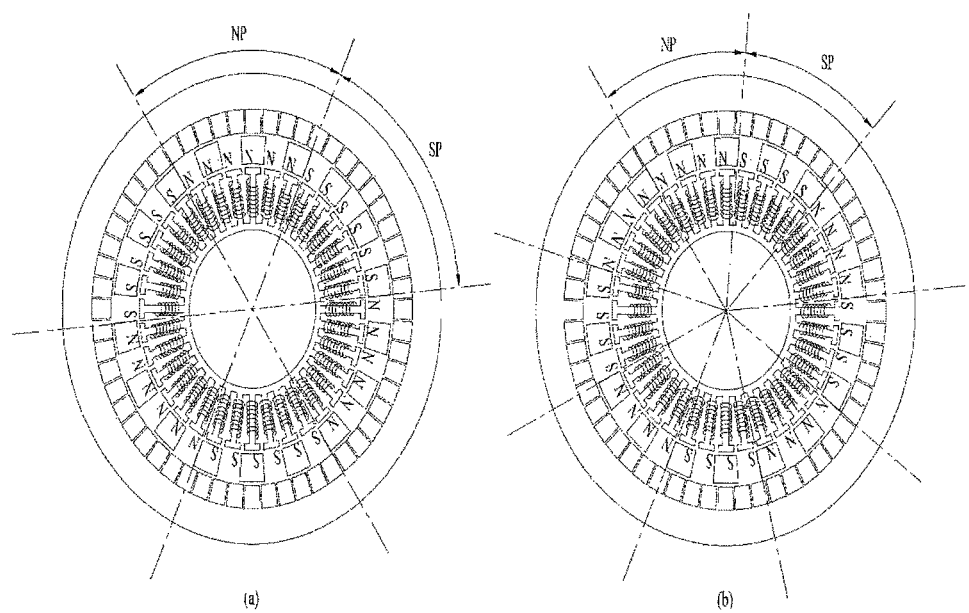

WASHING MACHINE

CROSS REFERENCE TO RELATED APPLICATIONS

This application is a U.S. National Phase Application under 35 U.S.C. § 371 of International Application PCT/KR2015/008358, filed on Aug. 10, 2015, which claims the benefit of Korean Application No. 10-2014-0103376, filed on Aug. 11, 2014, the entire contents of which are hereby incorporated by reference in their entireties.

TECHNICAL FIELD

The present invention relates to a washing machine and, more particularly, to a magnetic gear apparatus included in a washing machine.

BACKGROUND ART

A conventional magnetic gear, as exemplarily illustrated in FIG. 1, has a feature such that it includes an input magnetic gear unit which has a hollow shape and is rotatable about the center of rotation via magnetic attraction of pairs of N-poles and S-poles of a permanent magnet, a pole-piece unit which has a hollow shape and is rotatably provided around the outer surface of the input magnetic gear unit to create a magnetic path, and an output magnetic gear unit which has a hollow shape and is rotatably provided outside the pole-piece unit, the output magnetic gear unit including permanent magnets provided at the inner surface thereof such that N-poles and S-poles thereof are alternately arranged.

The deceleration ratio of the conventional magnetic gear is determined by the ratio of the number of dipole pairs of N-poles and S-poles included in the input magnetic gear unit as mentioned above to the number of dipole pairs of N-poles and S-poles included in the output magnetic gear unit.

The most important technical feature of the magnetic gear is to transmit a high torque via speed reduction.

However, the conventional magnetic gear mentioned above is problematically limited to the transmission of only a predetermined torque because the deceleration ratio is determined by the number of dipole pairs of N-poles and S-poles of the permanent magnets included in the input magnetic gear unit and the output magnetic gear unit.

In addition, existing motors and magnetic gears suffer from a reduction in the efficiency of power transmission because sudden variation of a magnetic field causes eddy current at the surface of the permanent magnet.

DISCLOSURE

Technical Problem

Therefore, the present invention has been made in view of the above problems, and it is one object of the present invention to provide a washing machine including a magnetic gear apparatus which is capable of transmitting various torques by controlling the deceleration ratio.

In addition, it is another object of the present invention to provide a washing machine including a magnetic gear apparatus which is capable of reducing eddy current generated at the surface of a permanent magnet, thereby achieving high efficiency.

Technical Solution

In accordance with one aspect of the present invention, the above and other objects can be accomplished by the provision of a washing machine including a rotational magnetic force generator configured to generate rotational magnetic force, the rotational magnetic force generator including one or more pairs of alternately arranged N-pole units and S-pole units, a magnetic path creator having a hollow shape so as to be provided at an outer circumferential surface of the rotational magnetic force generator, the magnetic path creator being configured to create a magnetic path of the rotational magnetic force generated from the rotational magnetic force generator, a rotor provided at an outer circumferential surface of the magnetic path creator, the rotor including permanent magnets provided at an inner circumferential surface thereof and being rotatable by the rotational magnetic force, a shaft connected to the rotor so as to be rotatable, and a drum connected to the shaft so as to be rotatable, the drum being configured to receive laundry therein, wherein the rotational magnetic force generator is configured to vary a rotation speed of the rotor as the number of the N-pole units and the S-pole units is adjusted.

The rotational magnetic force generator may include a body, a projection configured to protrude outward from a center of the body, and a coil wound around the projection to create a magnetic field at the projection.

The number of the N-pole units and the S-pole units may be controlled by current flowing through the coil.

A distal end of the projection and an inner circumferential surface of the magnetic path creator may be spaced apart from each other by a given distance in order to reduce eddy current loss.

The magnetic path creator may include a ferromagnetic portion having high magnetic permeability to create a magnetic path, and a paramagnetic portion having low magnetic permeability to make the creation of the magnetic path difficult, and the ferromagnetic portion and paramagnetic portion may be alternately arranged next to each other.

The magnetic path creator may not be rotated.

The permanent magnets may include N-poles and S-poles alternately arranged to face an outer circumference of the rotor. The permanent magnets may include N-poles periodically arranged to face an outer circumference of the rotor, and no permanent magnet may be present at either side of the respective N-poles.

The permanent magnets may include two or more permanent magnets layered in an outer circumferential direction to reduce eddy current loss.

Each of permanent magnets may be provided at a surface thereof with an insulation coating to reduce eddy current loss.

In accordance with another aspect of the present invention, the above and other objects can be accomplished by the provision of a transportation apparatus including a rotational magnetic force generator configured to generate rotational magnetic force, a magnetic path creator having a hollow shape so as to be provided at an outer circumferential surface of the rotational magnetic force generator, the magnetic path creator being configured to create a magnetic path of the rotational magnetic force generated from the rotational magnetic force generator, a rotor provided at an outer circumferential surface of the magnetic path creator, the rotor including permanent magnets provided at an inner circumferential surface thereof and being rotatable by the rotational magnetic force, a shaft connected to the rotor so as to be rotatable, a wheel connected to the shaft so as to be rotatable, and a tire provided at an outer circumferential surface of the wheel, wherein the rotational magnetic force generator includes one or more pairs of alternately arranged N-pole units and S-pole units, and is configured to vary a rotation speed of the rotor as the number of the N-pole units and the S-pole units is adjusted.

The rotational magnetic force generator may include a body, a projection configured to protrude outward from a center of the body, and a coil wound around the projection to create a magnetic field at the projection.

The number of the N-pole units and the S-pole units may be controlled by current flowing through the coil.

A distal end of the projection and an inner circumferential surface of the magnetic path creator may be spaced apart from each other by a given distance in order to reduce eddy current loss.

The magnetic path creator may include a ferromagnetic portion having high magnetic permeability to create a magnetic path, and a paramagnetic portion having low magnetic permeability to make the creation of the magnetic path difficult, and the ferromagnetic portion and paramagnetic portion may be alternately arranged next to each other.

The magnetic path creator may not be rotated.

The permanent magnets may include N-poles and S-poles alternately arranged to face an outer circumference of the rotor.

The permanent magnets may include N-poles periodically arranged to face an outer circumference of the rotor, and no permanent magnet may be present at either side of the respective N-poles.

The permanent magnets may include two or more permanent magnets layered in an outer circumferential direction to reduce eddy current loss.

Each of permanent magnets may be provided at a surface thereof with an insulation coating to reduce eddy current loss.

A magnetic gear apparatus may be provided in a drive source of a motor-driven movement apparatus such as, for example, a motor-assisted bicycle and a motorized wheelchair.

The magnetic gear apparatus may be provided in a main motor or in-wheel motor of a scooter and an electric vehicle.

The magnetic gear apparatus may be applied to the general field of industrial machines using motor decelerators.

Advantageous Effects

The present invention has the effect of providing a washing machine including a magnetic gear apparatus which is capable of transmitting various torques by controlling the deceleration ratio.

In addition, the present invention has the effect of providing a washing machine including a magnetic gear apparatus which is capable of reducing eddy current generated at the surface of a permanent magnet, thereby achieving high efficiency.

DESCRIPTION OF DRAWINGS

The accompanying drawings, which are included to provide a further understanding of the invention, illustrate embodiments of the invention and together with the description serve to explain the principle of the invention.

In the drawings:

FIG. 1 illustrates a conventional magnetic gear;

FIG. 2 illustrates a magnetic gear apparatus of the present invention;

FIG. 3 illustrates a structure of the present invention which is intended to prevent loss caused by eddy current;

FIG. 4 illustrates an embodiment in which the magnetic gear apparatus of the present invention is included in a washing machine;

FIG. 5 illustrates an embodiment in which the magnetic gear apparatus of the present invention is connected to a wheel of a transportation apparatus;

FIG. 6 illustrates one embodiment of a rotational magnetic force generator according to the present invention; and FIG. 7 illustrates an embodiment with regard to the control of the deceleration ratio of the magnetic gear apparatus according to the present invention.

BEST MODE

Hereinafter, exemplary embodiments of the present invention will be described in detail with reference to the accompanying drawings. The embodiments of the present invention may be modified into various forms, and the scope of the present invention should not be construed as being limited to the following embodiments. These embodiments are provided to more completely explain the present invention to those having ordinary skill in the art. Thus, the shapes of components are exaggerated to emphasize more clearly the explanation in the drawings.

The present invention has a feature such that a magnetic gear apparatus includes a rotational magnetic force generator 300 which serves to generate rotational magnetic force and has a hollow shape, a magnetic path creator 200 which has a hollow shape and is arranged at the outer circumferential surface of the rotational magnetic force generator 300 to create a magnetic path of the rotational magnetic force generated by the rotational magnetic force generator 300, and a rotor 100 which has a hollow shape and is rotatably provided at the outer circumferential surface of the magnetic path creator 200 to transmit power.

FIG. 2 illustrates, by way of example, the case where the rotational magnetic force generator 300 to generate rotational magnetic force, the magnetic path creator 200 to create the magnetic path of the rotational magnetic force generated by the rotational magnetic force generator 300, and the rotor 100 to transmit power via rotation thereof are provided.

As exemplarily illustrated in FIG. 2, the rotational magnetic force generator 300 has a hollow shape and is located about the center axis of the magnetic gear apparatus.

This differs from the principle of the conventional magnetic gear described above in which the input magnetic gear unit is rotated to transmit a torque to the output magnetic gear unit.

More specifically, the rotational magnetic force generator 300 included in the magnetic gear apparatus of the present invention has a feature such that it includes a stator which is used in a conventional motor. Accordingly, the rotational magnetic force generator 300 has a feature such that it does not rotate and generates rotational magnetic force via the control of current, thereby rotating the rotor 100.

The rotational magnetic force generator 300 generally includes a body 330 having a hollow shape, projections 310 protruding outward from the body 330 about the center axis of the magnetic gear apparatus, and coils 320 wound around the respective projections 310 to form magnetic poles.

The basic principle of generating rotational magnetic force by the rotational magnetic force generator 300 is identical to that of a stator used in a conventional motor and, thus, a detailed description thereof will be omitted herein.

However, note that the stator used in the conventional motor performs three-phase current control and, therefore, the number of magnetic poles to generate rotational magnetic force is determined based on the number of projections, whereas the rotational magnetic force generator 300 of the present invention may control the number of magnetic poles which generate rotational magnetic force by individually controlling the current applied to the coils 320 wound around the respective projections 310, rather than using the three-phase current control of the stator.

This is one of the important features of the present invention in connection with the control of the deceleration ratio which will be described below and, thus, will be described later in detail.

The magnetic path creator 200 is provided at the outer circumferential surface of the rotational magnetic force generator 300. The magnetic path creator 200 serves to create a magnetic path to allow the rotational magnetic force generated by the rotational magnetic force generator 300 to be transmitted to the rotor 100.

Accordingly, the magnetic path creator 200 of the present invention has a feature such that it includes ferromagnetic portions 210 having high magnetic permeability and paramagnetic portions 220 having low magnetic permeability.

In addition, the ferromagnetic portions 210 and the paramagnetic portions 220 are alternately provided one by one.

In one embodiment, the magnetic path creator 200 may be rotatable, or may be stationary so as not to be rotatable.

Specifically, the rotational magnetic force generated by the rotational magnetic force generator 300 described above needs to be transmitted to the rotor 100 through the magnetic path creator 200. Thus, the rotational magnetic force is transmitted to the ferromagnetic portions 210, having high magnetic permeability, of the magnetic path creator 200 and, in turn, transmitted to the rotor 100 rotatably provided at the outer circumferential surface of the magnetic path creator 200, thereby causing the rotation of the rotor 100.

The rotor 100 is rotatably provided at the outer circumferential surface of the magnetic path creator 200.

The rotor 100 is provided at the inner circumferential surface thereof with a permanent magnetic portion 110 for interaction with the rotational magnetic force.

Specifically, the permanent magnetic portion 110, as exemplarily illustrated in FIG. 2, has a feature such that N-poles and S-poles are alternately arranged to face inward in sequence.

This serves to allow the rotational magnetic force, generated by the rotational magnetic force generator 300, to pass through the magnetic path creator 200 and interact with the N-poles and the S-poles, alternately arranged in sequence, of the permanent magnetic portion 110 of the rotor 100, thereby rotating the rotor 100.

In addition, the permanent magnetic portion 110, as exemplarily illustrated in FIG. 2, may be configured such that N-poles are arranged in the outer circumferential direction with a space between the neighboring N-poles, rather than arranging S-poles next to the respective N-poles. This is because the magnetic field of an S-pole is present next to a magnet having an N-pole arranged in the outer circumferential direction based on the distribution of a magnetic field.

Providing the permanent magnetic portion 110 with the above-described configuration has the effect of reducing the number of magnets by half, resulting in reduced manufacturing costs.

FIG. 3 illustrates a structure of the present invention which is intended to prevent loss caused by eddy current.

Eddy current may be generated as the rotational magnetic force, generated by the rotational magnetic force generator 300, is transmitted to the rotor 100 through the magnetic path creator 200.

Eddy current is current in the faun of an eddy, which is generated in a conductor by electromagnetic induction due to rapid variation in a magnetic field applied to the conductor.

Deterioration in the efficiency of a motor or a magnetic gear apparatus due to eddy current occurs in the related art. The structure of the present invention to solve this problem will be described below in detail.

Eddy current loss is determined by $$P_e = k_e \frac{(tfB_m)^2}{\rho}.$$

Here, $P_e$ designates eddy current loss, and t designates the thickness of an iron plate.

To prevent the eddy current loss, as exemplarily illustrated in FIG. 3, each permanent magnet provided at the inner circumferential surface of the rotor 100 may include a first magnet 111, a second magnet 112, and a third magnet 113.

When the single permanent magnet is comprised of the first magnet 111, the second magnet 112, and the third magnet 113 which are layered in this sequence toward the outer circumference of the rotor 100 as exemplarily illustrated in FIG. 3, the thickness t of the permanent magnet is reduced, which has the effect of reducing eddy current loss, as represented by the above eddy current loss equation.

In addition, as exemplarily illustrated in FIG. 3, the first magnet 111, the second magnet 112, and the third magnet 113 may have an insulation coating. Unlike this, even when the permanent magnet takes the form of a single magnet, providing the insulation coating may reduce the eddy current loss.

In addition, to prevent the eddy current loss, the magnetic path creator 200 and the permanent magnetic portion 110 of the rotor 100 may be spaced apart from each other by a given distance.

In addition, the magnetic path creator 200 and distal ends of the projections 310 of the rotational magnetic force generator 300 may be spaced apart from each other by a given distance.

That is, the magnetic gear apparatus of the present invention may be configured such that the rotational magnetic force generator 300, the magnetic path creator 200, and the rotor 100 are spaced apart from each other by a given distance in the direction from the center axis toward the outer circumference.

FIG. 4 illustrates an embodiment in which the magnetic gear apparatus of the present invention is included in a washing machine.

A conventional washing machine, as exemplarily illustrated in FIG. 4, commonly includes a motor, instead of the magnetic gear apparatus of the present invention.

The conventional washing machine having the motor may control the rotation speed of a tub 500 via the control of current. However, when a great amount of laundry is received in the washing machine and a high torque is required, the conventional washing machine cannot control the torque required to rotate a drum 510.

However, the use of the magnetic gear apparatus of the present invention can solve the problem described above.

Referring to FIG. 4, a shaft 400 connected to the drum 510 may be located at the rotation axis of the magnetic gear apparatus of the present invention so as to be coupled to the rotor 100, in order to enable the transmission of power to the drum 510.

To this end, the shaft 400 may be provided at the rotation axis of the magnetic gear apparatus, and may be fixed to the rotor 100 so as to be rotated along with the drum 510.

In addition, since the shaft 400 is a rotating member, in order to disperse stress, the magnetic gear apparatus may include a bearing 101 around the outer circumferential surface of the shaft 400 at a connection region with the rotational magnetic force generator 300.

As such, the magnetic gear apparatus of the present invention may be included in the washing machine. This arrangement has the effect of generating various torques required to rotate the drum 510 based on the weight of laundry.

FIG. 5 illustrates an embodiment in which the magnetic gear apparatus of the present invention is connected to a wheel 700 of a transportation apparatus.

Referring to FIG. 5, the shaft 400 connected to the wheel 700 may be provided at the rotation axis of the magnetic gear apparatus of the present invention so as to be coupled to the rotor 100, in order to enable the transmission of power to the wheel 700.

To this end, the shaft 400 may be provided at the rotation axis of the magnetic gear apparatus, and may be fixed to the rotor 100 so as to be rotated along with the wheel 700. In addition, a tire 600 may be provided around the outer circumferential surface of the wheel 700 to allow the transportation apparatus to move using friction with the ground.

The transportation apparatus generally has a weight of 1000 kg or more, including the weight of an occupant. Thus, to allow a rotator to rotate while overcoming the weight, the bearing 101 may be interposed between the rotating shaft 400 and the magnetic gear apparatus provided around the outer circumferential surface of the shaft 400.

FIG. 6 illustrates one embodiment of the rotational magnetic force generator 300 of the present invention.

A method for controlling rotational magnetic force generated by the rotational magnetic force generator 300 will be described below in brief with reference to FIG. 6. The rotation magnetic generator used in the conventional motor, i.e. the stator described above generally generates rotational magnetic force based on the phase of current applied to each coil 320 through the use of three-phase current control. This technology is well known in the art and, thus, a detailed description thereof will be omitted herein.

In contrast, in the present invention, a different control method from that of the stator used in the conventional motor is adopted for the control of the deceleration ratio which will be described below.

More specifically, as exemplarily illustrated in FIG. 6, the projections 310, around which the coils 320 are wound, are included in the rotational magnetic force generator 300 to form magnetic poles A1 to A6 and B1 to B6.

In this case, six projections 310 constitute a single unit and a total of 36 projections 310 are provided. That is, the deceleration ratio, acquired in the case where a total of three pairs of N-poles and S-poles are included in the input magnetic gear unit of the magnetic gear described above, is assumed.

In this case, current is controlled such that every magnetic pole A1 has an N-pole and, simultaneously, every magnetic pole B1 has an S-pole. At this time, current is controlled such that all magnetic poles A2 to A6 have an N-pole and all magnetic poles B2 to B6 have an S-pole.

In this case, all of the magnetic poles A1 to A6 have an N-pole and all of the magnetic poles B1 to B6 have an S-pole.

Thereafter, current is controlled such that every magnetic pole A1 has an S-pole and every magnetic pole B1 has an N-pole.

At this time, current is controlled such that the magnetic poles A2 to A6 maintain an N-pole and the magnetic poles B2 to B6 maintain an S-pole.

In this case, when viewed in the clockwise direction, the magnetic poles A2 to B1 have an N-pole and the magnetic poles B2 to A1 have an S-pole.

That is, by controlling current once, an N-pole unit and an S-pole unit each including the six projections 310 are moved in the clockwise direction by an angle of one projection 310, i.e. by an angle of 10 degrees.

Next, in the state in which the magnetic poles A1 and B1 are maintained, i.e. in the state in which every magnetic pole A1 maintains an S-pole and every magnetic pole B1 maintains an N-pole, current is controlled such that every magnetic pole A2 has an S-pole and, simultaneously, every magnetic pole B2 has an N-pole.

At this time, the magnetic poles A3 to A6 need to maintain an N-pole and the magnetic poles B3 to B6 need to maintain an S-pole.

With the control of current described above, consequently, the N-pole unit and the S-pole unit are again moved in the clockwise direction by an angle of one projection 310, i.e. by an angle of 10 degrees.

The magnetic gear apparatus of the present invention generates rotational magnetic force via the current control of the magnetic poles A1 to A6 and B1 to B6 by repeating the above-described control process.

Accordingly, when attempting to rotate the magnetic gear apparatus in reverse, reverse rotation is also possible by performing the above-described current control in the opposite direction.

FIG. 7 illustrates an embodiment with regard to the control of the deceleration ratio by the magnetic gear apparatus of the present invention.

Hereinafter, the control of the deceleration ratio of the magnetic gear apparatus according to the present invention will be described with reference to FIG. 7.

FIG. 7(a) illustrates one embodiment of the rotational magnetic force generator 300 having a plurality of units each including the six projections 310 in the same manner as the rotational magnetic force generator 300 of FIG. 6.

The rotational magnetic force generator 300 may include a total of 36 projections 310 and may be divided into six units. In the case of the rotor 100 corresponding to the output gear of the related art, it may include 56 permanent magnets. In this case, the deceleration ratio may be represented by the number of units included in the rotational magnetic force generator 300 divided by the number of permanent magnets included in the rotor 100 and, thus, may have a value of 1/9.33.

FIG. 7(b) illustrates one embodiment of the rotational magnetic force generator 300 including a plurality of units each having four projections 310.

Although the total number of projections 310 included in the rotational magnetic force generator 300 is 36 in the same manner as in FIG. 7(a), in this case, the four projections 310 constitute a single unit. Therefore, unlike the above-described embodiment of FIG. 7(a), the rotational magnetic force generator 300 may be divided into 9 units. The number of permanent magnets of the rotor 100 corresponding to the output gear of the related art may be 56 in the same manner as in FIG. 7(a). In this case, the deceleration ratio may be represented by the number of units included in the rotational magnetic force generator 300 divided by the number of permanent magnets included in the rotor 100 and, thus, may have a value of 1/4.66.

That is, the present invention achieve the remarkable effect of varying the deceleration ratio of the magnetic gear apparatus merely by controlling the current, without changing the number of projections 310 included in the rotational magnetic force generator 300 and the number of permanent magnets included in the rotor 100.

The magnetic gear apparatus may be provided in a drive source of a motor-driven movement apparatus such as, for example, a motor-assisted bicycle and a motorized wheelchair.

In addition, the magnetic gear apparatus may be provided in a main motor or in-wheel motor of a scooter and an electric vehicle.

In addition, the magnetic gear apparatus may be applied to the general field of industrial machines using motor decelerators.

The above detailed description is intended to exemplify the present invention. In addition, the above description has explained the exemplary embodiments of the present invention, and the present invention may be used in various other combinations, changes, and environments. That is, the conceptual range of the present invention disclosed in this specification may be changed or modified within the scope of the above disclosure, equivalents, and/or technologies or knowledge of the art. The embodiments described above have been described in the best manner to implement the technical idea of the present invention and various modifications required in the concrete application fields and purposes of the present invention are possible. Accordingly, the above detailed description of the present invention is not intended to limit the present invention to the disclosed embodiments. In addition, the accompanying claims should be construed as including other embodiments.

Mode For Invention

As described above, a related description has sufficiently been discussed in the above "Best Mode" for implementation of the present invention.

INDUSTRIAL APPLICABILITY

As described above, the present invention may be wholly or partially applied to a washing machine including a magnetic gear apparatus.

The invention claimed is:
1. A washing machine comprising:
a rotational magnetic force generator configured to generate rotational magnetic force, the rotational magnetic force generator including one or more pairs of alternately arranged N-pole units and S-pole units;
a magnetic path creator having a hollow shape so as to be provided at an outer circumferential surface of the rotational magnetic force generator, the magnetic path creator being configured to create a magnetic path of the rotational magnetic force generated from the rotational magnetic force generator;
a rotor provided at an outer circumferential surface of the magnetic path creator, the rotor including permanent magnets provided at an inner circumferential surface thereof and being rotatable by the rotational magnetic force, wherein each of the permanent magnets maintains a permanent magnetic pole same as when installed in the rotor;
a shaft connected to the rotor so as to be rotatable; and
a drum connected to the shaft so as to be rotatable, the drum being configured to receive laundry therein,
wherein the rotational magnetic force generator includes:
a body;
a plurality of projections configured to protrude outward from a center of the body; and
a coil wound around each of the plurality of projections to create N-pole and S-pole magnetic fields at each of the plurality of the projections,
wherein the one or more pairs of alternately arranged N-pole units and S-pole units include adjacent projections that have a same magnetic pole, and
wherein the rotational magnetic force generator is configured to vary a number of N-pole units and S-pole units by individually controlling a magnetic pole of each of the plurality of projections, comprising:
controlling a direction of current applied to the coil wound around each of the plurality of projections to change a deceleration ratio of the rotor by adjusting a ratio of the number of N-pole units and S-pole units to a number of the permanent magnets, wherein a change of the deceleration ratio varies a rotation speed of the rotor.

2. The washing machine according to claim 1, wherein a distal end of the projection and an inner circumferential surface of the magnetic path creator are spaced apart from each other by a given distance in order to reduce eddy current loss.

3. The washing machine according to claim 1, wherein the magnetic path creator includes:
a ferromagnetic portion having high magnetic permeability to create a magnetic path; and
a paramagnetic portion having low magnetic permeability to make the creation of the magnetic path difficult,
wherein the ferromagnetic portion and paramagnetic portion are alternately arranged next to each other.

4. The washing machine according to claim 3, wherein the magnetic path creator is not rotated.

5. The washing machine according to claim 1, wherein the permanent magnets include N-poles and S-poles alternately arranged to face an outer circumference of the rotor.

6. The washing machine according to claim 1, wherein the permanent magnets include N-poles periodically arranged to face an outer circumference of the rotor, and no permanent magnet is present at either side of the respective N-poles.

7. The washing machine according to claim 5, wherein the permanent magnets include two or more permanent magnets layered in an outer circumferential direction to reduce eddy current loss.

8. The washing machine according to claim 5, wherein each of permanent magnets is provided at a surface thereof with an insulation coating to reduce eddy current loss.

9. The washing machine according to claim 7, wherein each of the permanent magnets is provided at a surface thereof with an insulation coating to reduce eddy current loss.

* * * * *